US005171469A

United States Patent [19]

Hittich et al.

[11] Patent Number: 5,171,469

[45] Date of Patent: Dec. 15, 1992

[54] LIQUID-CRYSTAL MATRIX DISPLAY

[75] Inventors: Reinhard Hittich, Modautal; Georg Weber, Erzhausen; Herbert Plach, Darmstadt; Andreas Wächtler, Griesheim; Bernard Scheuble, Seeheim-Jugenheim, all of Fed. Rep. of Germany

[73] Assignee: Merck Patent Gesellschaft mit beschraenkter Haftung, Darmstadt, Fed. Rep. of Germany

[21] Appl. No.: 806,795

[22] Filed: Dec. 12, 1991

Related U.S. Application Data

[63] Continuation of Ser. No. 570,462, Aug. 21, 1990, abandoned.

[30] Foreign Application Priority Data

Aug. 22, 1989 [DE] Fed. Rep. of Germany ....... 3927674

[51] Int. Cl.[5] ...................... C09K 19/52; C09K 19/34; C09K 19/12; G02F 1/13

[52] U.S. Cl. .......................... 252/299.01; 252/299.61; 252/299.66; 252/299.67; 359/103

[58] Field of Search ...................... 252/299.01, 299.61, 252/299.63, 299.64, 299.65, 299.66, 299.67; 359/103

[56] References Cited

U.S. PATENT DOCUMENTS

| | | | |
|---|---|---|---|
| 4,302,352 | 11/1981 | Eidenschink et al. | 252/299.63 |
| 4,419,264 | 12/1983 | Eidenschink et al. | 252/299.63 |
| 4,808,333 | 2/1989 | Huynh-ba et al. | 252/299.66 |
| 4,910,350 | 3/1990 | Tanaka et al. | 570/129 |
| 5,064,567 | 11/1991 | Funada et al. | 252/299.61 |
| 5,122,295 | 6/1992 | Weber et al. | 252/299.01 |

FOREIGN PATENT DOCUMENTS 0087012 8/1983 European Pat. Off. .

*Primary Examiner*—Robert L. Stoll
*Assistant Examiner*—Shean C. Wu
*Attorney, Agent, or Firm*—Millen, White, Zelano and Branigan

[57] ABSTRACT

The invention relates to a liquid-crystal matrix display having integrated nonlinear components and containing a liquid-crystal mixture having particularly high specific resistance.

22 Claims, No Drawings

LIQUID-CRYSTAL MATRIX DISPLAY

This application is a continuation of application Ser. No. 07/570,462, filed Aug. 21, 1990, now abandoned.

BACKGROUND OF THE INVENTION

This invention relates to a liquid-crystal matrix display having two plane-parallel carrier plates which, together with a frame, form a cell, a nematic liquid-crystal mixture contained in the cell and having positive dielectric anisotropy and high specific resistance.

Such liquid-crystal matrix displays (LCM displays) are known. As nonlinear components for the individual switching of the individual image points, use may be made, for example, of active components (e.g., transistors). In that case, reference is made to an "active matrix", a distinction being made between two types:

1. MOS (Metal Oxide Semiconductor) transistors on a silicon wafer as substrate,

2. Thin-film transistors (TFT) on a glass plate as substrate.

In the case of type 1, the dynamic scattering or the guest-host effect is normally used as the electro-optical effect. The use of monocrystalline silicon as substrate material limits the size of the display since even the modular combination of different subdisplays leads to problems at the joints.

In the case of the more promising type 2, which is preferred, the TN effect is normally used as the electro-optical effect. A distinction is made between two technologies: TFTs made from compound semiconductors such as, for example, CdSe or TFTs based on polycrystalline or amorphous silicon. The latter technology is being worked on worldwide with great intensity.

The TFT matrix is applied to the inside of a glass plate of the display, while the other glass plate carries the transparent counterelectrode on the inside. Compared with the size of the image point electrode, the TFT is very small and virtually does not disturb the image. This technology can also be extended for fully color-capable image representations in which a mosaic of red, green and blue filters are arranged in a manner such that a switchable image element is situated opposite each filter element.

The TFT displays normally work as TN cells with crossed polarizers in transmission and are illuminated from behind.

Here the term LCM displays encompasses any matrix display having integrated nonlinear components, i.e. in addition to the active matrix, also displays having passive components such as varistors or diodes (MIM=-metal-insulator metal).

Such LCM displays are suitable, in particular, for TV applications (for example pocket television sets) or for displays with high information content in motor vehicle or aircraft construction. In addition to problems relating to the angular dependence of the contrast and the switching times, difficulties arise in the case of LCM displays due to the insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, Sept. 1984: A 210-288 Matrix LCD Controlled by Double Stage Diode Rings, p. 141 ff, Paris; STROMER, M., Proc. Eurodisplay 84, Sept. 1984: Design of Thin Film Transistors for Matrix Addressing of Television Liquid Crystal Displays, p. 145 ff, Paris]. As the resistance decreases, the contrast of an LCM display deteriorates. Since the specific resistance of the liquid-crystal mixture in general decreases over the lifetime of an LCM display due to the interaction with the inner surfaces of the display, a high (initial) resistance is very important in order to obtain acceptable service lives.

There is consequently still a great need for LCM displays with very high specific resistance accompanied at the same time by large working temperature range, short switching times and low threshold voltage.

SUMMARY OF THE INVENTION

This invention provides ICM displays which do not have the disadvantages specified above or only have them to a small extent and at the same time have very high specific resistances.

It has now been found that this can be achieved if nematic liquid-crystal mixtures which are based on the components A, B and C, B and A, B and C, or B specified below are used in said display elements.

The invention consequently relates to an LCM display having two plane-parallel carrier plates which, together with a frame, form a cell, integrated nonlinear components for switching individual image points on the carrier plates, and a nematic liquid-crystal mixture contained in the cell and having positive dielectric anisotropy and high specific resistance, characterized in that the liquid-crystal mixture is based on the following components:

a) up to 96% by weight of a liquid-crystalline component B composed of one or more compounds having a dielectric anisotropy of more than +1.5, b) 0 to 70% by weight of a liquid-crystalline component A composed of one or more compounds having a dielectric anisotropy of −1.5 to +1.5 of the general formula I:

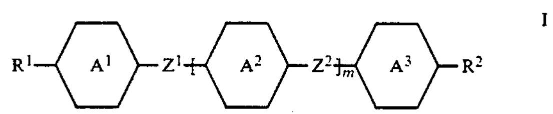

in which $R^1$ and $R^2$ are, in each case independently of each other, n-alkyl, ω-fluoroalkyl or n-alkenyl containing up to 9 carbon atoms, the rings $A^1$, $A^2$ and $A^3$ are, in each case independently of each other, 1,4-phenylene, 2- or 3-fluoro-1,4-phenylene, trans-1,4-cyclohexenylene or 1,4-cyclohexenylene, $Z^1$ and $Z^2$ are, in each case independently of each other, $-CH_2CH_2-$ or a single bond, and m is 0, 1 or 2, c) 0 to 0% by weight of a liquid-crystalline component C composed of one or more compounds having a dielectric anisotropy of less than −1.5, and d) 4 to 15% by weight of a highly clarifying component D composed of one or more compounds of the formula:

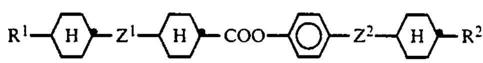

in which $R^1$, $R^2$, $Z^1$ and $Z^2$ have the meaning specified in the case of formula I, and the nematic liquid-crystal mixture has a nematic phase range of at least 60° C. and a viscosity at 0° C. of not more than 30 mPa.s.

The invention also relates to corresponding liquid-crystal mixtures, in particular for use in LCM displays. The mixtures are, however, also suitable for many other applications such as, for example, TN, STN or OMI. All components D have a high clearing point above 250° C. and are used to increase the c p. of the composition of this invention without adversely affecting other properties.

The specific resistance of liquid-crystal mixtures is in general high if the dielectric anisotropy is low, since the polar components present in mixtures having high $\Delta\epsilon$ have a stabilizing action on ions and consequently a high conductivity or a low resistance. Surprisingly, it has not been found that the specific resistance is high particularly if the means permittivity $\epsilon=[=\frac{1}{3}(2\epsilon_{195}+\epsilon_{11})]$ is low and at the same time the dielectrically neutral ($\Delta\epsilon$ from $-1.5$ to $+1.5$) components of the liquid-crystal mixture contain no functional groups such as, for example, aromatically bound alkoxy or ester functions. The dielectrically positive ($\Delta\epsilon\geqq 1.5$) components usually carry terminal cyano groups. Preferably, however, in addition to the compounds having terminal cyano, also those having terminal —NCS, F, Cl, $-CF_3$, $-CHF_2$, $-OCF_3$, $-OCF_2CF_2H$ or $-OC_2F_5$ are used in the mixtures according to the invention.

Component B can, however, also be composed essentially only of nitrile-containing compounds, those compounds of the formulae IIa to IIf having X=CN being preferred. In this case, the liquid-crystal mixture is composed essentially of the components A, B and C, or A and B.

Particularly preferred are liquid-crystal mixtures containing nitrile-containing and nitrile-free fluorinated compounds, the latter preferably corresponding to formulae IIa to IIf in which X is F, Cl, $-CF_3$, $-CHF_2$, $-OCF_3$, $-OCHF_2$, $-OCF_2CF_2H$ or $-OC_2F_5$.

The nitrile-free:nitrile-containing compound ratio of component B is preferably >1:1, in particular >2:1. Particularly preferred ranges are 2.5:1 to 6:1.

Very particularly preferred are, however, liquid-crystal mixtures whose component B is composed essentially of nitrile-free fluorinated compounds. The above-mentioned preferred compounds of the formulae IIa to IIf are preferably used.

'Essentially' is intended to mean that the proportion of further compounds in the relevant component is ≦20%, in particular ≦10%.

Liquid-crystal mixtures whose component B contains terminally chlorinated compounds are furthermore preferred. Such compounds are known to the person skilled in the art and preferably correspond to the formulae IIa to IIf, with X=Cl. In a particularly preferred embodiment, the mixtures contain one or more compounds of the formula IIa to IIf in which $A^2$—X or $A^3$—X is

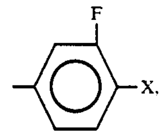

where $X=CF_3$, $-OCF_3$, $-OCHF_2$ or Cl. Component B may furthermore also contain tetranuclear compounds, for example corresponding to the formulae IIc to IIf in which one of the rings $X^1$ to $X^3$ is present in duplicate.

In a particularly preferred embodiment, the mixtures contain compounds having terminal nitrile in a proportion of 0 to 50% by weight in component B. Particularly preferred are mixtures which do not contain any compounds having terminal nitrile. Surprisingly, it has been found that groups such as $-OCF_3$, $-OCHF_2$, $-OCF_2CF_2H$ or $-OC_2F_5$ stabilize ions in the displays to a significantly lesser extent than $-OCH_3$ or $-OC_2H_5$. The same also applies to aliphatically bound alkoxy (compounds of the formulae III and IV).

The mixtures according to the invention preferably have a specific resistance at 20° of $\geqq 10^{12}\Omega\cdot$cm, in particular, preferably $>10^{13}\Omega\cdot$cm. The mean $\epsilon$ is preferably ≦7, in particular, preferably ≦5.

The values of the dielectric anisotropy of the individual compounds of the components A to D are determined at 20° by extrapolation from a polar mixture (containing 24% p-trans-4-propylcyclohexylbenzonitrile, 36% p-trans-4-pentylcyclohexylbenzonitrile, 25% p-trans-4-heptylcyclohexylbenzonitrile and 15% 4-cyano-4'-(trans-4-pentylcyclohexyl)biphenyl) if the compound to be determined contains a dipole in the long molecular axis, or from a neutral mixture (containing 22% trans-1-p-ethylphenyl-4-propylcyclohexane, 20% trans-1-p-methoxyphenyl-1-propylcyclohexane, 15% trans-1-p-ethoxyphenyl-4-propylcyclohexane, 19% 4-ethyl-4-(trans-4-propylcyclohexyl)biphenyl, 14% 4-ethyl-4'-(trans-4-pentylcyclohexyl)biphenyl, 5% 4,4'-bis(trans-4-propylcyclohexyl)biphenyl and 5% 4-(trans-4-pentylcyclohexyl)-4'-(trans-4-propylcyclohexyl)biphenyl) in the case of neutral compounds.

The liquid-crystal mixtures according to the invention make it possible to achieve a high value for the specific resistance simultaneously accompanied by low viscosities, as a result of which outstanding LCM displays can be achieved. The LCM displays according to the invention preferably operate at the first transmission minimum as suggested by Gooch and Tarry [C. H. Gooch and H. A. Tarry, Electron. Lett. 10, 2–4, 1974; C. H. Gooch and H. A. Tarry, Appl. Phys., Vol. 8, 1575–1584, 1975], a smaller dielectric anisotropy being sufficient in this case, in addition to particularly favorable electro-optical properties such as, for example, high slope of the characteristic and low angular dependence of the contrast (German Patent Specification 3,022,818) accompanied by the same threshold voltage as in an analog display at the second minimum. As a result of this, markedly higher specific resistances can be achieved using the mixtures according to the invention at the first minimum.

The viscosity at 20° C. is preferably ≦25 mPa.s. The nematic phase range is preferably at least 70°, in particular at least 80°. Preferably this range extends at least from −20° to +70°.

The individual compounds of the formulae I to IV and their subformulae which can be used in the LCM displays according to the invention are either known or they can be prepared in an analogous manner to the known compounds.

Preferred usable liquid-crystal mixtures according to the invention contain in total preferably 10% to 70%, in particular 10% to 40%, of compounds of the formula I. If component B is not predominantly composed of strongly dielectrically positive nitrile components but predominantly contains only weakly dielectrically positive compounds such as, for example, those specified fluorinated compounds below, component A may under certain circumstances be omitted entirely and the mixtures according to the invention may be based in this particular embodiment solely on component B or possibly also component C. Particularly preferred are liquid-crystal mixtures whose component B contains one or more compounds selected from the groups comprising compounds of the formulae IIa to IIf:

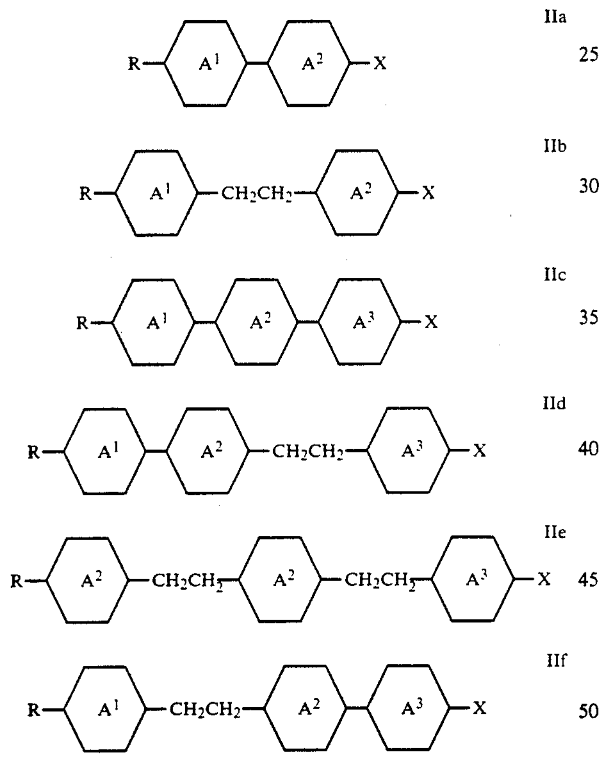

in which

R is n-alkyl or n-alkenyl containing up to 9 carbon atoms,

X is cyano, —NCS, F, Cl, $—CF_3$, $—CHF_2$, $—OCF_3$, $—OCHF_2$, $—OCF_2CF_2H$ or $—OC_2F_5$, and the rings $A^1$, $A^2$ and $A^3$ are, in each case independently of each other, 1,4-phenylene, 2- or 3-fluoro-1,4-phenylene, 2,3-difluoro-1,4-phenylene, trans- 1,4-cyclohexenylene or 1,4-cyclohexenylene.

Preferably component B contains compounds of the formulae IIa to IIf in which X is cyano and compounds of the formulae IIa to IIf in which X is —NCS, F, Cl, $—CF_3$, $—CHF_2$, $—OCF_3$, $—OCHF_2$, $—OCF_2CF_2H$ or $—OC_2F_5$, and the proportion of the cyano compounds in component B is 0 to 50% by weight.

In a particularly preferred embodiment, component B contains no compounds of the formulae IIa to IIf in which X is cyano.

In the compounds of the subformulae IIa to IIf, X is preferably F, Cl, $CF_3$, $—OCF_3$, $—OCHF_2$ or $CHF_2$.

The rings $A^1$, $A^2$ and $A^3$ are preferably, in each case independently of each other, trans-1,4-cyclohexylene or 1,4-phenylene. In a preferred embodiment, one of the rings $A^1$, $A^2$ and $A^3$ is 2- or 3-fluoro-1,4-phenylene or 2,3-difluoro-1,4-phenylene. The ring linked to X (i.e. $A^2$ in IIa and IIb or $A^3$ in IIc to IIf) is preferably 1,4-phenylene which may optionally also be mono- or disubstituted by fluorine. $A^2$—X or $A^3$—X is preferably a group selected from the formulae (a) to (h):

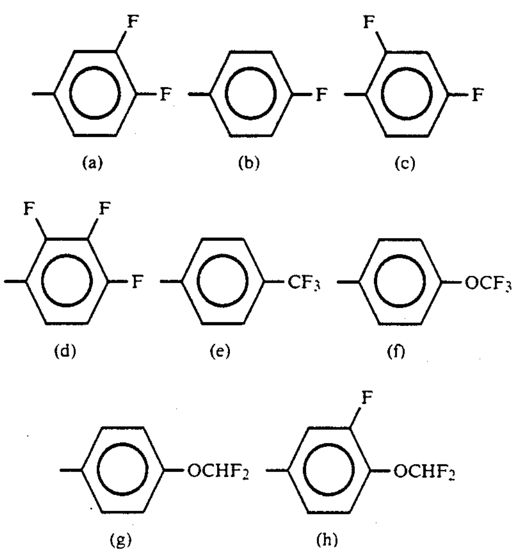

where (a), (b), (d), (f), (g) and (h) are particularly preferred.

Particularly preferred smaller groups of compounds are specified below:

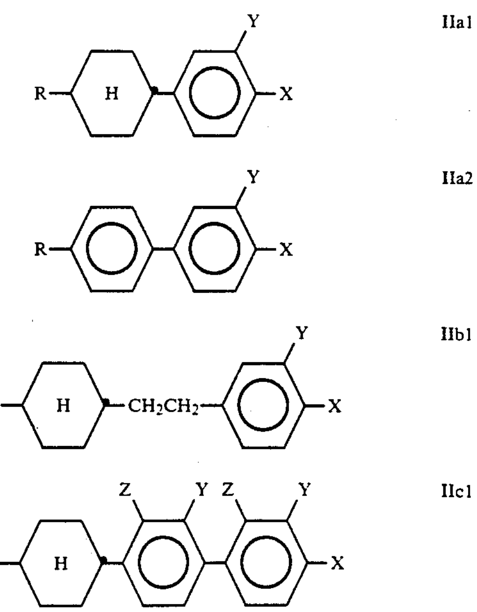

-continued

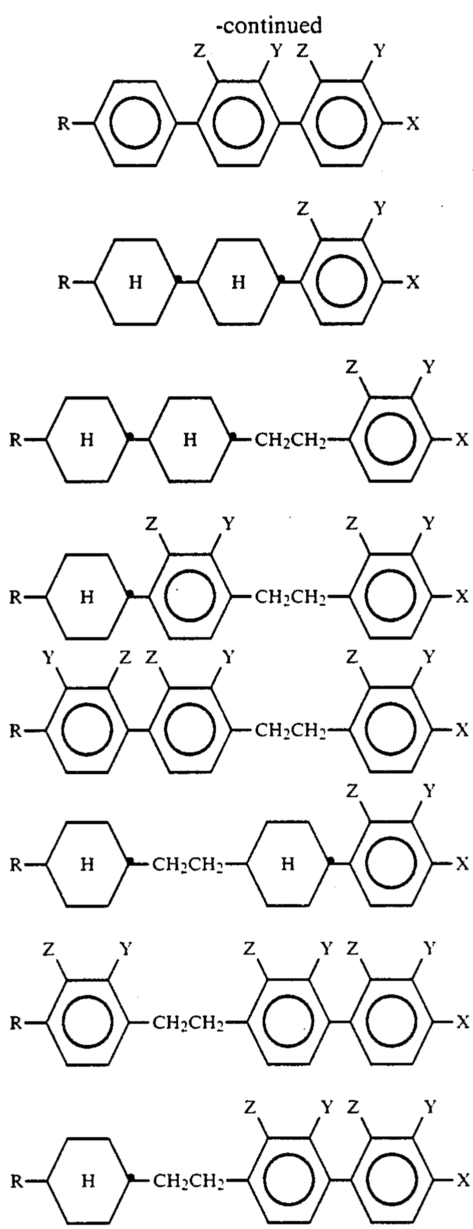

In the subformulae IIa1 to IIf3, R is in each case n-alkyl or n-alkenyl containing up to 9 carbon atoms. Y and Z are, in each case independently of each other, H or F, but at the same time one or two of the radicals Y and Z is/are preferably fluorine. X is, however, preferably F, Cl, —$CF_3$—, —$OCF_3$ or —$OCHF_2$.

Component B preferably forms 10% to 100%, in particular 20% to 80%, of the mixtures according to the invention.

Component A preferably contains one or more compounds selected from the group comprising II1 to II7:

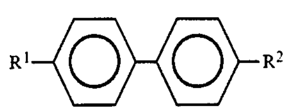

-continued

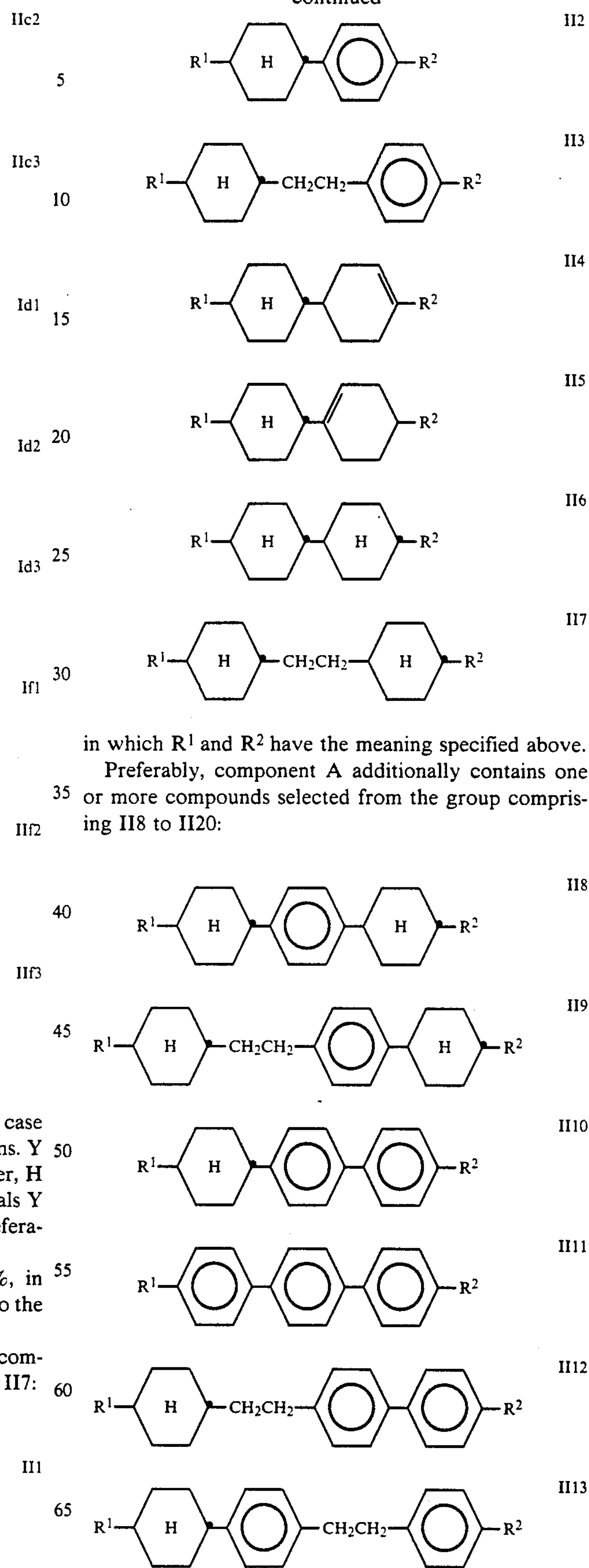

in which $R^1$ and $R^2$ have the meaning specified above.

Preferably, component A additionally contains one or more compounds selected from the group comprising II8 to II20:

-continued

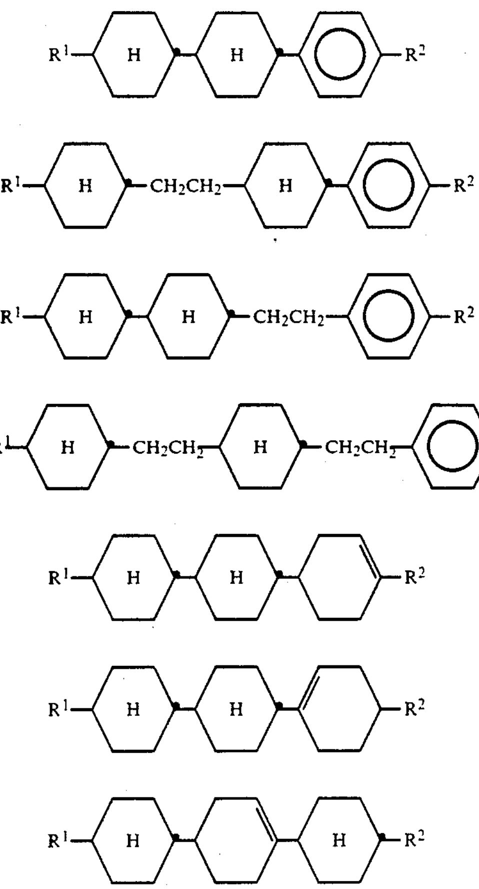

in which $R^1$ and $R^2$ have the meaning specified above and the 1,4-phenylene groups in II8 to II17 may, in each case independently of each other, also be mono- or polysubstituted by fluorine, e.g., but 1-2, e.g., two F atoms.

Preferably, component A furthermore additionally contains one or more compounds selected from the group comprising II21 to II25:

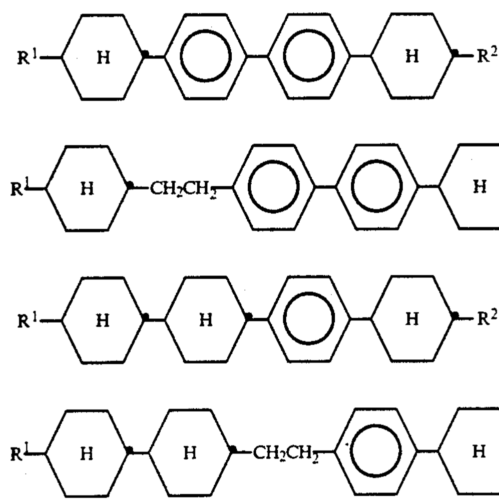

-continued

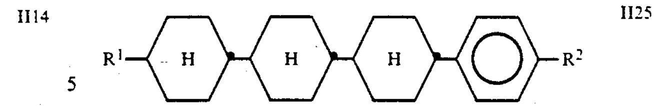

in which $R^1$ and $R^2$ have the meaning specified above and the 1,4-phenylene groups in II21 to II25 may, in each case independently of each other, also be mono- or polysubstituted by fluorine, e.g., by 1-2, e.g., two F atoms.

Finally, those mixtures are preferred whose component A contains one or more compounds selected from the group comprising II26 and II27:

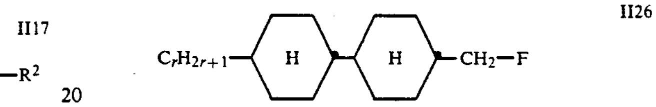

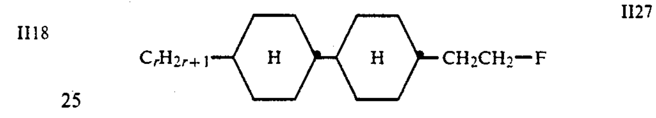

in which $C_rH_{2r+1}$ is a straight-chain alkyl group containing up to 7 carbon atoms.

In some cases the addition of compounds of the formula:

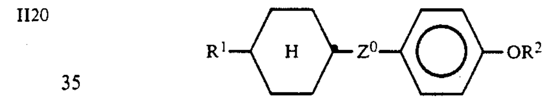

in which $R^1$ and $R^2$ have the meaning specified above and $Z^0$ is a single bond, $—CH_2CH_2—$,

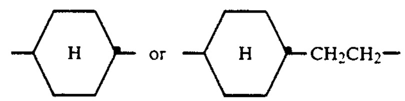

proves advantageous for suppressing smectic phases, although the specific resistance is thereby reduced. To achieve optimum combinations of parameters for the application, the person skilled in the art can easily determine whether, and if so, in what quantity these compounds may be added. Normally less than 15%, in particular 5-10% are used.

Liquid-crystal mixtures are furthermore preferred which contain, in addition to the components A, B and C additionally one or more compounds selected from the group comprising III and IV:

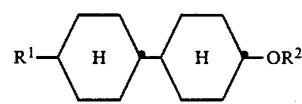

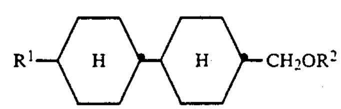

in which $R^1$ and $R^2$ have the meaning specified above, and/or one or more compounds selected from the group comprising V and VI:

V

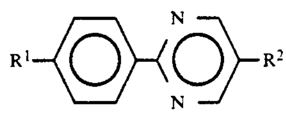

VI

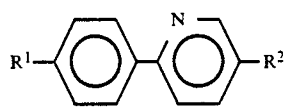

in which $R^1$ and $R^2$ have the meaning specified above, and/or one or more compounds selected from the group comprising VII to XI:

VII

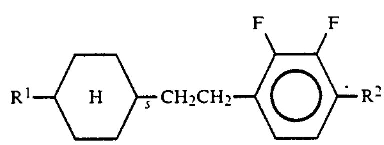

VIII

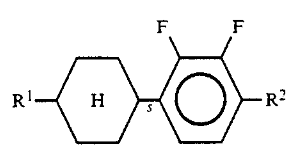

IX

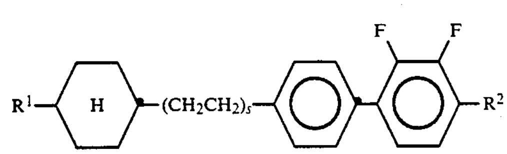

X

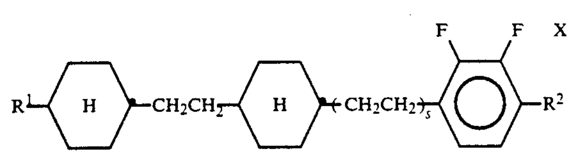

XI

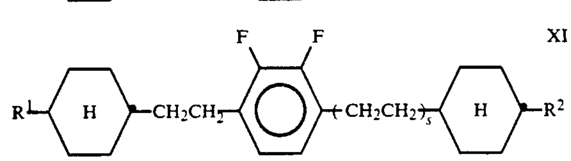

in which $R^1$ and $R^2$ have the meaning specified above and s is 0 or 1.

The proportion of the compounds of the formulae III to XI in the mixtures according to the invention (preferred ranges) emerges from the following table:

| | |
|---|---|
| Total of the compounds III and IV: | 0% to 40%, preferably 10% to 30% |
| Total of the compounds V and VI: | 0% to 40%, preferably 5% to 20% |
| Total of the compounds VII to XI: | 0% to 20%, preferably 5% to 15% |

The proportion of the component D is preferably 5 to 12% by weight, and preferably two or more homologues of the component D are added. Component D may contain the following preferred compounds D1, D2 and D3:

D1

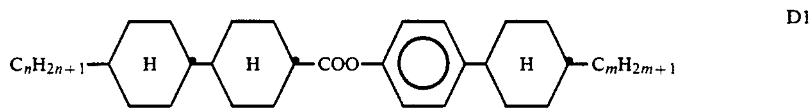

D2

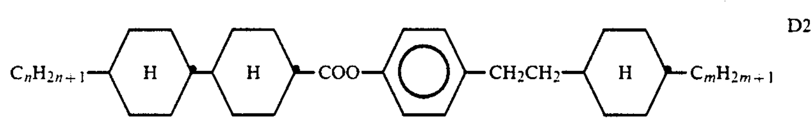

D3

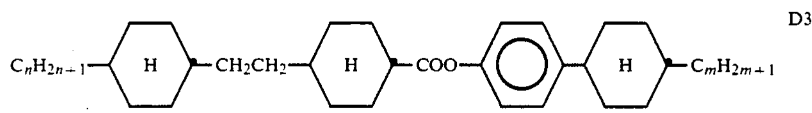

n and m are, in each case independently or each other, preferably 2, 3, 4 or 5. Preferred combinations for n and m are: 3/3, 3/4, 3/5, 2/3, 4/3, 5/3, 3/2. D1 is particularly preferred.

When included, the amount of component C is 1% to 20%; preferred amounts are 5% to 20%.

It is self-evident that the mixtures according to the invention, which are preferably composed essentially of the preferred compounds specified for the component A to D, may also optionally contain still other compounds not explicitly mentioned here. In many cases, however, unfavorable properties then result. The person skilled in the art can easily determine whether and, if applicable, in what amounts further compounds may be used.

The construction of the LCM display according to the invention from polarizers, electrode base plates and electrodes with surface treatment corresponds to the conduction usual for such displays. In this connection, the definition of the usual construction is in this case interpreted widely and also encompasses all variations and modifications of the LCM display, in particular also matrix display elements based on polysilicon TFT or MIM.

An essential difference between the displays according to the invention and the hitherto usual ones based on the twisted nematic cell is, however, the choice of the liquid-crystal parameters of the liquid-crystal layer.

The usable liquid-crystal mixtures according to the invention are prepared in a manner usual per se. As a rule, the desired amount of the components used in smaller amount is dissolved in the components forming the main constituent, expediently at elevated temperature. It is also possible to mix solutions of the components in an organic solvent, for example in acetone, chloroform or methanol and to remove the solvent again after mixing, for example by distillation.

The dielectrics may also contain further additives known to the person skilled in the art and described in the literature. For example, 0–15% pleochroic dyestuffs or chiral dopants may be added.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, if any, cited above and below, and of corresponding application Federal Republic of Germany P 3927674.0 filed Aug. 22, 1990, are hereby incorporated by reference.

The composition of the mixtures of Examples 1 to 25 is specified below, the individual compounds being coded as follows:

| | |
|---|---|
| PCH-301: | trans-1-p-methoxyphenyl-4-propylcyclohexane |
| CCH-301: | trans.trans-4-methoxy-4'-propylcyclohexylcyclohexane |
| CBC-33F: | 4,4'-bis(trans-4-propylcyclohexyl)-2-fluorobiphenyl |
| CBE-55F: | 4,4'-bis(trans-4-pentylcyclohexyl)-2-fluorobiphenyl |
| CBC-53F: | 4-(trans-4-pentylcyclohexyl)-4'-(trans-4-propylcyclohexyl)-2-fluorobiphenyl |
| CBC-33: | 4,4'-bis(trans-4-propylcyclohexyl)biphenyl |
| CBC-55: | 4,4'-bis(trans-4-pentylcyclohexyl)biphenyl |
| CBC-53: | 4-(trans-4-pentylcyclohexyl)-4'-(trans-4-propylcyclohexyl)biphenyl |
| ECCP-33: | 1-[trans-4-(trans-4-propylcyclohexyl)-cyclohexyl]-2-(p-propylphenyl)ethane |
| CCH-51F: | trans,trans-4-fluoromethyl-4'-pentylcyclohexylcyclohexane |
| CCH-31F: | trans,trans-4-fluoromethyl-4'-propylcyclohexylcyclohexane |
| PTP-102: | 4-methyl-4'-ethoxytolane |
| PTP-201: | 4-methoxy4'-ethyltolane |
| CPTP-301: | 4-(trans-4-propylcyclohexyl)-4'-methoxytolane |
| CPTP-302: | 4-(trans-4-propylcyclohexyl)-4'-ethoxytolane |
| CPTP-303: | 4-(trans-4-propylcyclohexyl)-4'-propoxytolane |
| PCH-5F: | trans-1-p-fluorophenyl-4-pentylcyclohexane |
| PCH-6F: | trans-1-p-fluorophenyl-4-hexylcyclohexane |
| PCH-7F: | trans-1-p-fluorophenyl-4-heptylcyclohexane |
| EPCH-20CF$_3$: | 1-(trans-4-ethylcyclohexyl)-2-(p-trifluoromethoxyphenyl)ethane |
| EPCH-30CF$_3$: | 1-(trans-4-propylcyclohexyl)-2-(p-trifluoromethoxyphenyl)ethane |
| EPCH-50CF$_3$: | 1-(trans-4-pentylcyclohexyl)-2-(p-trifluoromethoxyphenyl)ethane |
| EPCH-70CF$_3$: | 1-(trans-4-heptylcyclohexyl)-2-(p-trifluoromethoxyphenyl)ethane |
| PCH-30CF$_3$: | trans-1-p-trifluoromethoxyphenyl-4-propylcyclohexane |
| PCH-50CF$_3$: | trans-1-p-trifluoromethoxyphenyl-4-pentylcyclohexane |
| ECCP-30CF$_3$: | 1-[trans-4-(trans-4-propylcyclohexyl)-cyclohexyl]-2-(p-trifluoromethoxyphenyl)-ethane |
| ECCP-50CF$_3$: | 1-[trans-4-(trans-4-pentylcyclohexyl)-cyclohexyl]-2-(p-trifluoromethoxyphenyl)-ethane |
| CCP-20CF$_3$: | p-[trans-4-(trans-4-ethylcyclohexyl)cyclohexyl]trifluoromethoxybenzene |

-continued

| | |
|---|---|
| CCP-30CF$_3$: | p-[trans-4-(trans-4-propylcyclohexyl)-cyclohexyl]trifluoromethoxybenzene |
| CCP-40CF$_3$: | p-[trans-4-(trans-4-butylcyclohexyl)cyclohexyl]trifluoromethoxybenzene |
| CCP-50CF$_3$: | p-[trans-4-(trans-4-pentylcyclohexyl)-cyclohexyl]trifluoromethoxybenzene |
| BCH-30CF$_3$: | 4-trifluoromethoxy-4'-(trans-4-propylcyclohexyl)biphenyl |
| ECCP-3F.F: | 1-[trans-4-(trans-4-propylcyclohexyl)-cyclohexyl]-2-(3,4-difluorophenyl)ethane |
| ECCP-5F.F: | 1-[trans-4-(trans-4-pentylcyclohexyl)-cyclohexyl]-2-(3,4-difluorophenyl)ethane |
| CCP-3F.F: | 4-[trans-4-(trans-4-propylcyclohexyl)-cyclohexyl]-1,2-difluorobenzene |
| CCP-5F.F: | 4-[trans-4-(trans-4-pentylcyclohexyl)-cyclohexyl]-1,2-difluorobenzene |
| CCP-3F: | 4-[trans-4-(trans-4-propylcyclohexyl)-cyclohexyl]fluorobenzene |
| ECCP-3F: | 1-[trans-4-(trans-4-propylcyclohexyl)-cyclohexyl]-2-(p-fluorophenyl)ethane |
| ECCP-5F: | 1-[trans-4-(trans-4-pentylcyclohexyl)-cyclohexyl]-2-(p-fluorophenyl)ethane |
| CP-3F: | p-fluorophenyl trans-4-(tran-4-propylcyclohexyl)cyclohexanecarboxylate |
| CP-5F: | p-fluoropheny trans-4-(trans-4-pentylcyclohexyl)-cyclohexanecarboxylate |
| PYP-5F: | 2-p-fluorophenyl-5-pentylpyrimidine |
| PYP-6F: | 2-p-fluorophenyl-5-hexylpyrimidine |
| PYP-7F: | 2-p-fluorophenyl-5-heptylpyrimidine |
| PYP-30CF$_3$: | 2-p-trifluoromethoxyphenyl-5-propylpyrimidine |
| PYP-50CF$_3$: | 2-p-trifluoromethoxyphenyl-5-pentylpyrimidine |
| PYP-70CF$_3$: | 2-p-trifluoromethoxyphenyl-5-heptylpyrimidine |
| PCH-2: | p-trans-4-ethylcyclohexylbenzonitrile |
| PCH-3: | p-trans-4-propylcyclohexylbenzonitrile |
| PCH-4: | p-trans-4-butylcyclohexylbenzonitrile |
| PCH-5: | p-trans-4-pentylcyclohexylbenzonitrile |
| ECCP-3 | 1-[trans-4-(trans-4-propylcyclohexyl)-cyclohexyl]-2-(p-cyanophenyl)ethane |
| ECCP-3CF$_3$: | 1-[trans-4-(trans-4-propylcyclohexyl)-cyclohexyl]-2-(p-trifluoromethylphenyl)-ethane |
| ECCP-5CF$_3$: | 1-[trans-4-(trans-4-pentylcyclohexyl)-cyclohexyl]-2-(p-trifluoromethylphenyl)-ethane |
| PYP-5N.F: | 2-(3-fluoro-4-cyanophenyl)-5-pentylpyrimidine |
| PYP-7N.F: | 2-(3-fluoro-4-cyanophenyl)-5-heptylpyrimidine |
| PCH-30CF$_2$: | trans-1-p-difluoromethoxyphenyl-4-propylcyclohexane |
| PCH-50CF$_2$: | trans-1-p-difluoromethoxyphenyl-4-pentylcyclohexane |
| CCPC-33: | p-(trans-4-propylcyclohexyl)phenyl trans-(trans-4-propylcyclohexyl)cyclohexanecarboxylate |
| CCPC-34: | p-(trans-4-butylcyclohexyl)phenyl trans-(trans-4-propylcyclohexyl)cyclohexanecarboxylate |
| CCPC-35: | p-(trans-4-pentylcyclohexyl)phenyl trans-(trans-4-propylcyclohexyl)cyclohexanecarboxylate |

| Example 1 | | Example 2 | |
|---|---|---|---|
| PCH-301 | 10.00 | PCH-30CF$_2$ | 9.00 |
| PCH-7F | 4.00 | PCH-50CF$_2$ | 8.00 |
| EPCH-30CF$_3$ | 9.00 | PCH-70CF$_2$ | 9.00 |
| EPCH-70CF$_3$ | 5.00 | CCH-301 | 7.00 |
| CCP-30CF$_3$ | 13.00 | CCP-30CF$_3$ | 13.00 |
| CCP-50CF$_3$ | 12.00 | CCP-50CF$_3$ | 12.00 |
| ECCP-30CF$_3$ | 12.00 | ECCP-30CF$_3$ | 8.00 |
| ECCP-50CF$_3$ | 8.00 | ECCP-50CF$_3$ | 6.00 |
| ECCP-3F.F | 12.00 | ECCP-3F.F | 9.00 |
| ECCP-3F | 8.00 | ECCP-3F | 6.00 |
| CBC-33F | 2.00 | CCPC-33 | 5.00 |
| CCPC-33 | 3.00 | CCPC-34 | 4.00 |
| CCPC-34 | 2.00 | CCPC-35 | 4.00 |

-continued

| Example 3 | | Example 4 | |
|---|---|---|---|
| CCH-301 | 7.00 | PCH-5F | 13.0 |
| PCH-5F | 12.00 | PCH-7F | 10.0 |
| PCH-7F | 9.00 | CCP-30CF$_3$ | 13.0 |
| CCP-30CF$_3$ | 13.00 | CCP-40CF$_3$ | 11.0 |
| CCP-50CF$_3$ | 12.00 | CCP-50CF$_3$ | 12.0 |
| ECCP-30CF$_3$ | 11.00 | ECCP-30CF$_3$ | 11.0 |
| ECCP-50CF$_3$ | 8.00 | ECCP-50CF$_3$ | 8.0 |
| ECCP-3F.F | 12.00 | ECCP-3F.F | 9.0 |
| ECCP-3F | 7.00 | ECCP-5F.F | 6.0 |
| CCPC-33 | 3.00 | CCPC-33 | 3.0 |
| CCPC-34 | 3.00 | CCPC-34 | 2.0 |
| CCPC-35 | 3.00 | CCPC-35 | 2.0 |

| Example 5 | | Example 6 | |
|---|---|---|---|
| PCH-5F | 11.0 | PCH-5F | 13.0 |
| PCH-6F | 4.0 | PCH-7F | 10.0 |
| PCH-7F | 10.0 | CCP-20CF$_3$ | 10.0 |
| CCP-20CF$_3$ | 9.0 | CCP-30CF$_3$ | 13.0 |
| CCP-30CF$_3$ | 13.0 | CCP-40CF$_3$ | 7.0 |
| CCP-40CF$_3$ | 7.0 | CCP-50CF$_3$ | 11.0 |
| CCP-50CF$_3$ | 11.0 | ECCP-30CF$_3$ | 11.0 |
| ECCP-30CF$_3$ | 10.0 | ECCP-3F.F | 10.0 |
| ECCP-50CF$_3$ | 8.0 | ECCP-3F | 8.0 |
| ECCP-3F.F | 8.0 | CCPC-33 | 3.0 |
| CCPC-33 | 3.0 | CCPC-34 | 2.0 |
| CCPC-34 | 3.0 | CCPC-35 | 2.0 |
| CCPC-35 | 3.0 | | |

| Example 7 | | Example 8 | |
|---|---|---|---|
| PCH-5F | 13.0 | PCH-5F | 13.0 |
| PCH-7F | 10.0 | PCH-7F | 10.0 |
| CCP-20CF$_3$ | 10.0 | CCP-20CF$_3$ | 10.0 |
| CCP-30CF$_3$ | 13.0 | CCP-30CF$_3$ | 13.0 |
| CCP-40CF$_3$ | 7.0 | CCP-40CF$_3$ | 7.0 |
| CCP-50CF$_3$ | 11.0 | CCP-50CF$_3$ | 11.0 |
| ECCP-30CF$_3$ | 11.0 | ECCP-3F.F | 10.0 |
| ECCP-3F.F | 10.0 | ECCP-5F.F | 8.0 |
| ECCP-5F.F | 7.0 | ECCP-3F | 11.0 |
| CCPC-33 | 3.0 | CCPC-33 | 3.0 |
| CCPC-34 | 3.0 | CCPC-34 | 2.0 |
| CCPC-35 | 2.0 | CCPC-35 | 2.0 |

| Example 9 | | Example 10 | |
|---|---|---|---|
| PCH-5F | 12.0 | PCH-5F | 12.0 |
| PCH-7F | 10.0 | PCH-6F | 9.0 |
| CCP-20CF$_3$ | 11.0 | PCH-7F | 10.0 |
| CCP-30CF$_3$ | 13.0 | CCP-20CF$_3$ | 11.0 |
| CCP-40CF$_3$ | 7.0 | CCP-30CF$_3$ | 13.0 |
| CCP-50CF$_3$ | 12.0 | CCP-40CF$_3$ | 5.0 |
| ECCP-30CF$_3$ | 9.0 | CCP-50CF$_3$ | 12.0 |
| ECCP-3F.F | 9.0 | ECCP-3F.F | 9.0 |
| ECCP-5F.F | 5.0 | ECCP-5F.F | 5.0 |
| ECCP-3F | 6.0 | ECCP-3F | 5.0 |
| CCPC-33 | 3.0 | CCPC-33 | 3.0 |
| CCPC-34 | 2.0 | CCPC-34 | 3.0 |
| | | CCPC-35 | 3.0 |

| Example 11 | | Example 12 | |
|---|---|---|---|
| PCH-5F | 12.0 | PCH-5F | 10.0 |
| PCH-6F | 8.0 | PCH-6F | 5.0 |
| PCH-7F | 10.0 | PCH-7F | 7.0 |
| CCP-20CF$_3$ | 11.0 | CCP-20CF$_3$ | 11.0 |
| CCP-30CF$_3$ | 13.0 | CCP-30CF$_3$ | 13.0 |
| CCP-40CF$_3$ | 5.0 | CCP-40CF$_3$ | 6.0 |
| CCP-50CF$_3$ | 12.0 | CCP-50CF$_3$ | 11.0 |
| ECCP-3F.F | 11.0 | ECCP-30CF$_3$ | 7.0 |
| ECCP-5F.F | 8.0 | ECCP-50CF$_3$ | 3.0 |
| CCPC-33 | 4.0 | ECCP-3F.F | 9.0 |
| CCPC-34 | 3.0 | ECCP-5F.F | 4.0 |
| CCPC-35 | 3.0 | ECCP-3F | 7.0 |
| | | CCPC-33 | 3.0 |
| | | CCPC-34 | 2.0 |
| | | CCPC-35 | 2.0 |

| Example 13 | | Example 14 | |
|---|---|---|---|
| PCH-2 | 9.0 | PCH-2 | 8.0 |
| PCH-3 | 22.0 | PCH-3 | 21.0 |
| PCH-4 | 4.0 | PCH-4 | 7.0 |
| PCH-5 | 12.0 | PCH-5F | 12.0 |
| PCH-7F | 11.0 | PCH-7F | 11.0 |
| ECCP-3F | 9.0 | ECCP-3F | 9.0 |
| ECCP-5F | 8.0 | ECCP-5F | 8.0 |
| CP-3F | 9.0 | CP-3F | 9.0 |
| CP-5F | 7.0 | CP-5F | 8.0 |
| CCPC-33 | 5.0 | CCPC-33 | 4.0 |
| CCPC-35 | 4.0 | CCPC-34 | 3.0 |

| Example 15 | | Example 16 | |
|---|---|---|---|
| PCH-3 | 14.00 | PCH-5F | 20.00 |
| PCH-5F | 14.00 | PCH-6F | 15.00 |
| PCH-7F | 14.00 | PCH-7F | 15.00 |
| PCH-53 | 10.00 | ECCP-3F | 10.00 |
| ECCP-3F | 6.00 | ECCP-5F | 10.00 |
| ECCP-5F | 6.00 | CCPC-33 | 5.00 |
| ECCP-3CF$_3$ | 5.00 | CCPC-34 | 5.00 |
| CCPC-33 | 5.00 | CCPC-35 | 5.00 |
| CCPC-34 | 5.00 | CBC-33F | 5.00 |
| CCPC-35 | 5.00 | CBC-53F | 5.00 |
| CBC-33F | 5.00 | CBC-55F | 5.00 |
| CBC-53F | 6.00 | | |
| CBC-55F | 5.00 | | |

| Example 17 | | Example 18 | |
|---|---|---|---|
| PCH-3 | 18.00 | PCH-3 | 10.00 |
| PCH-5F | 12.00 | PCH-5F | 18.00 |
| PCH-6F | 12.00 | PCH-6F | 14.00 |
| PCH-7F | 10.00 | PCH-7F | 10.00 |
| ECCP-3F | 7.00 | ECCP-3F | 9.00 |
| ECCP-5F | 7.00 | ECCP-5F | 7.00 |
| ECCP-33 | 5.00 | CBC-33 | 5.00 |
| CCPC-33 | 5.00 | CBC-53 | 6.00 |
| CCPC-34 | 5.00 | CBC-55 | 5.00 |
| CCPC-35 | 4.00 | CBC-33F | 5.00 |
| CBC-33F | 5.00 | CBC-53F | 6.00 |
| CBC-53F | 5.00 | CBC-55F | 5.00 |
| CBC-55F | 5.00 | | |

The properties of the mixtures from Examples 1 to 18 are specified in the following table:

| | Example | | | | | | | | | | | | | | | | | |
|---|---|---|---|---|---|---|---|---|---|---|---|---|---|---|---|---|---|---|
| Property | 1 | 2 | 3 | 4 | 5 | 6 | 7 | 8 | 9 | 10 | 11 | 12 | 13 | 14 | 15 | 16 | 17 | 18 |
| Clearing point [°C.] | 98 | 99 | 98 | 101 | 99 | 100 | 99 | 98 | 100 | 86 | 88 | 100 | 75 | 72 | 94 | 88 | 93 | 92 |
| Viscosity at 20° (mPa · s) | 15 | 15 | 15 | | | | | 15 | 15 | 14 | 14 | 15 | 17 | 16 | 17 | 15 | 17 | |
| $\Delta\epsilon$ | +4.0 | +6.6 | +5.9 | | | | | +4.0 | +4.6 | +4.0 | +4.0 | +3.9 | +7.9 | +7.9 | +4.6 | +2.7 | +5.2 | |
| $\epsilon_{\parallel}$ | | 7.0 | | | | | | 6.8 | 7.5 | 6.9 | 7.0 | 6.6 | 11.9 | 11.9 | 7.6 | | 8.4 | |
| V(10.0,20) [volt] | 2.44 | 2.40 | 2.57 | 2.52 | 2.27 | 2.29 | 2.20 | 2.26 | 2.27 | 2.13 | 2.20 | 2.33 | 1.56 | 1.48 | 2.15 | 2.98 | 2.03 | 2.23 |

Further mixtures according to the invention are specified below:

| Example 19 | | Example 20 | |
|---|---|---|---|
| CCH-301 | 7.00 | PCH-5F | 13.0 |
| PCH-5F | 12.00 | PCH-7F | 10.0 |
| PCH-7F | 9.00 | CCP-30CF$_3$ | 13.0 |
| CCP-3F.F | 13.00 | CCP-40CF$_3$ | 11.0 |
| CCP-5F.F | 12.00 | CCP-50CF$_3$ | 12.0 |
| ECCP-30CF$_3$ | 11.00 | ECCP-30CF$_3$ | 11.0 |
| ECCP-50CF$_3$ | 8.00 | ECCP-50CF$_3$ | 8.0 |
| ECCP-3F.F | 12.00 | CCP-3F.F | 9.0 |
| ECCP-3F | 7.00 | CCP-5F.F | 6.0 |
| CCPC-33 | 3.00 | CCPC-33 | 3.0 |
| CCPC-34 | 3.00 | CCPC-34 | 2.0 |
| CCPC-35 | 3.00 | CCPC-35 | 2.0 |

| Example 21 | | Example 22 | |
|---|---|---|---|
| PCH-5F | 11.0 | PCH-3 | 14.00 |

-continued

| | | | |
|---|---|---|---|
| PCH-6F | 4.0 | PCH-5F | 14.00 |
| PCH-7F | 10.0 | PCH-7F | 14.00 |
| CCP-20CF$_3$ | 9.0 | PCH-53 | 10.00 |
| CCP-30CF$_3$ | 13.0 | CCP-3F | 6.00 |
| CCP-40CF$_3$ | 7.0 | CCP-5F | 6.00 |
| CCP-50CF$_3$ | 11.0 | CCP-3F.F | 5.00 |
| CCP-2F.F | 10.0 | CCPC-33 | 5.00 |
| CCP-5F.F | 8.0 | CCPC-34 | 5.00 |
| CCP-3F.F | 8.0 | CCPC-35 | 5.00 |
| CCPC-33 | 3.0 | CBC-33F | 5.00 |
| CCPC-34 | 3.0 | CBC-53F | 6.00 |
| CCPC-35 | 3.0 | CBC-55F | 5.00 |
| Example 23 | | Example 24 | |
| PCH-5F | 20.00 | PCH-3 | 18.00 |
| PCH-6F | 15.00 | PCH-5F | 12.00 |
| PCH-7F | 15.00 | PCH-6F | 12.00 |
| CCP-3F.F | 10.00 | PCH-7F | 10.00 |
| CCP-5F.F | 10.00 | CCP-3F.F | 7.00 |
| CCPC-33 | 5.00 | CCP-5F.F | 7.00 |
| CCPC-34 | 5.00 | ECCP-33 | 5.00 |
| CCPC-34 | 5.00 | CCPC-33 | 5.00 |
| CBC-33F | 5.00 | CCPC-34 | 5.00 |
| CBC-53F | 5.00 | CCPC-35 | 4.00 |
| CBC-55F | 5.00 | CBC-33F | 5.00 |
| | | CBC-53F | 5.00 |
| | | CBC-55F | 5.00 |
| Example 25 | | | |
| PCH-3 | 10.00 | | |
| PCH-5F | 18.00 | | |
| PCH-6F | 14.00 | | |
| PCH-7F | 10.00 | | |
| CCP-3F.F | 9.00 | | |
| CCP-5F.F | 7.00 | | |
| CCPC-33 | 5.00 | | |
| CCPC-34 | 6.00 | | |
| CCPC-35 | 5.00 | | |
| CBC-33F | 5.00 | | |
| CBC-53F | 6.00 | | |
| CBC-55F | 5.00 | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a liquid-crystal matrix display comprising two plane-parallel carrier plates which, together with a frame, form a cell, integrated nonlinear components for switching individual image points on the carrier plates, and a nematic liquid-crystal mixture contained in the cell, having positive dielectric anisotropy and high specific resistance, the improvement wherein said liquid-crystal mixture comprises the following components:

a) 10 to 96% by weight of a liquid-crystalline component B composed of one or more compounds having a dielectric anisotropy of more than +1.5 selected from compounds of the formula IIa to IIf:

IIa

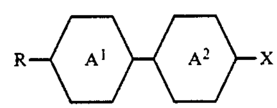

-continued

IIb

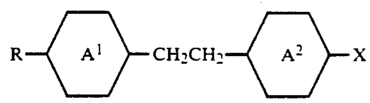

IIc

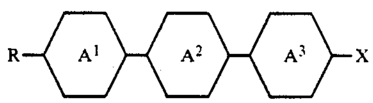

IId

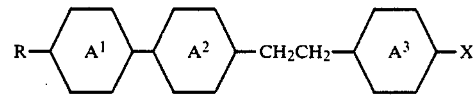

IIe

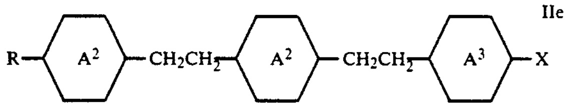

IIf

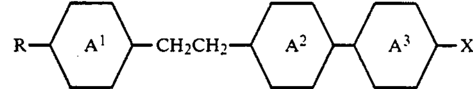

in which

R is n-alkyl or n-alkenyl, each containing up to 9 carbon atoms,

X is cyano, —NCS, F, Cl, $CF_3$, —$CHF_2$, —$OCF_3$, —$OCHF_2$, —$OCF_2CF_2H$ or —$OC_2F_5$, and the rings $A^1$, $A^2$ and $A^3$ are, in each case independently of each other, 1,4-phenylene, 2- or 3-fluoro-1,4-phenylene, 2,3-difluoro-1,4-phenylene, trans-1,4-cyclohexylene or 1,4-cyclohexenylene, b) 0 to 70% by weight of a liquid-crystalline component A composed of one or more compounds having a dielectric anisotropy of −1.5 to +1.5 of the formula I:

I

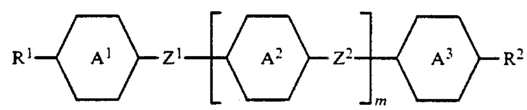

wherein $R_1$ and $R^2$ are, in each case independently of each other, n-alkyl, ω-fluoroalkyl or n-alkenyl, each containing up to 9 carbon atoms, the rings $A_1$ and $A^2$ are, in each case independently of each other, 1,4-phenylene, 2- or 3-fluoro-1,4-phenylene, trans-1,4-cyclohexylene or 1,4-cyclohexenylene, $Z^1$ and $Z^2$ are, in each case independently of each other, —$CH_2CH_2$— or a single bond, and m is 0, 1 and 2, c) 0 to 20% by weight of a liquid-crystalline component C composed of one or more compounds having a dielectric anisotropy of less than −1.5 and d) 5 to 15% by weight of a compound D composed of one or more compounds of the formula:

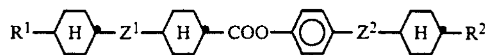

in which $R^1$, $R^2$, $Z^1$ and $Z^2$ are as defined for formula I, and the nematic liquid-crystal mixture has a nematic phase range of at least 60° C. and a viscosity at 20° C. of not more than 30 mPa.s, and wherein component B comprises at least 80% nitrile-free fluorinated compounds.

2. A display of claim 1, wherein component B contains nitrile-containing and nitrile-free fluorinated compounds.

3. A display of claim 1, wherein component B is composed of at least 80% nitrile-free fluorinated compounds.

4. A display of claim 1 wherein component B contains compounds of the formulae IIa to IIf in which X is cyano, compounds of the formulae IIa to IIf in which X is —NCS, F, Cl, —$CF_3$, —$CHF_2$, —$OCF_3$, $OCHF_2$, —$OCF_2CF_2H$ or —$OC_2F_5$, or a mixture thereof.

5. A display of claim 4, wherein component B contains no compounds of the formulae IIa to IIf in which X is cyano.

6. A display of claim 1, wherein X is F, Cl, $CF_3$, —$OCF_3$, —$OCHF_2$ or $CHF_2$.

7. A display of claim 1, wherein component A contains one or more compounds II1 to II7:

II1

II2

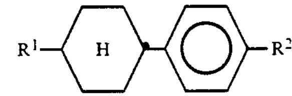

II3

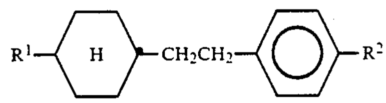

II4

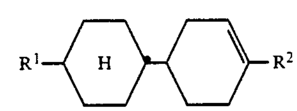

II5

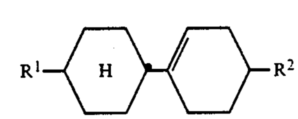

II6

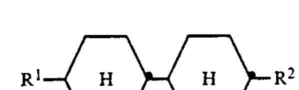

II7

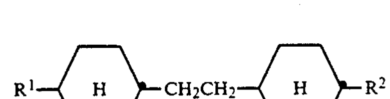

in which $R^1$ and $R^2$ are as defined in claim 1.

8. A display of claim 7, wherein component A additionally contains one or more compounds II8 to II20:

II8

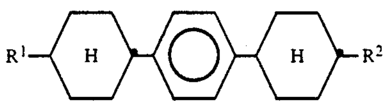

II9

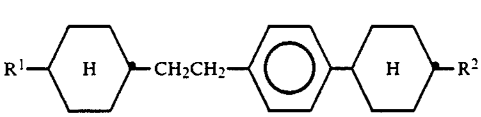

II10

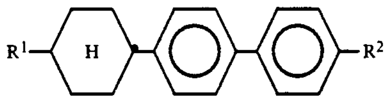

II11

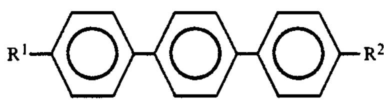

II12

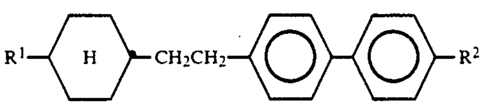

II13

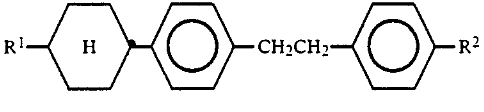

II14

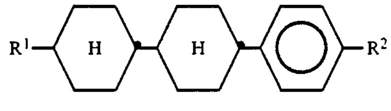

II15

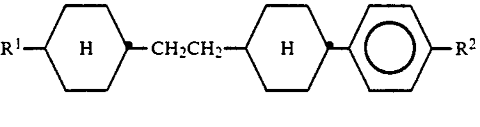

II16

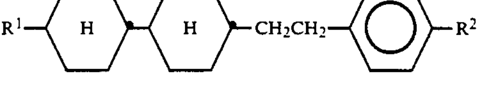

II17

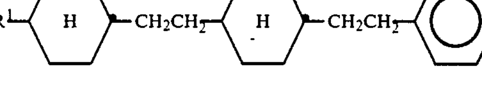

II18

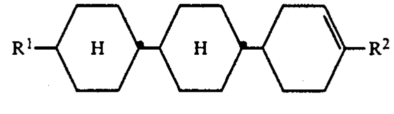

II19

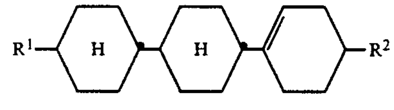

II20

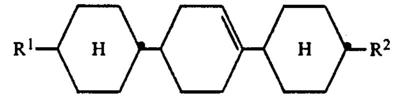

in which $R^1$ and $R^2$ are as defined in claim 7, and the 1,4-phenylene groups in II8 to II17 may, in each case independently of each other, also be mono- or polysubstituted by fluorine.

9. A display of claim 7, wherein component A additionally contains one or more compounds II21 to II25:

II21

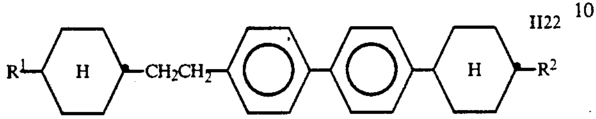

II22

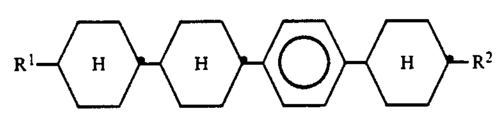

II23

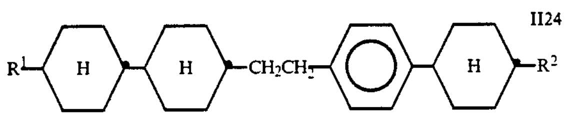

II24

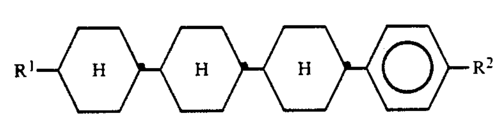

II25 in which $R^1$ and $R^2$ are as defined in claim 7 and the 1,4-phenylene groups in II21 to II25 may, in each case independently of each other, also be mono- or polysubstituted by fluorine.

10. A display of claim 1, wherein component A contains one or more compounds II26 and II27:

II26

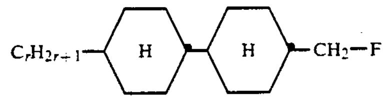

II27

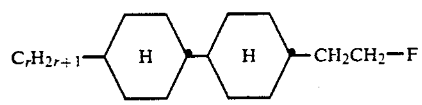

in which $C_rH_{2r+1}$ is a straight-chain alkyl group containing up to 7 carbon atoms.

11. A display of claim 1, wherein the liquid-crystal mixture contains, in addition to the components A, B and C, one or more compounds III and IV:

III

IV

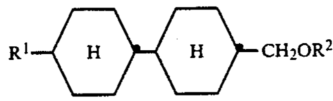

in which $R^1$ and $R^2$ are as defined in claim 1.

12. A display of claim 1, wherein the liquid-crystal mixture contains, in addition to the components A, B and C, one or more compounds of the formula:

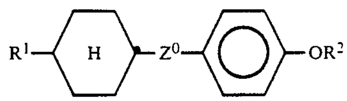

in which $R^1$ and $R^2$ are as defined in claim 1 and

Z° is a single bond, $-CH_2CH_2-$,

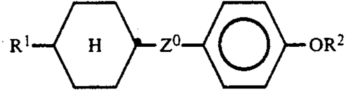

13. A display of claim 1, wherein the liquid-crystal mixture contains, in addition to the components A, B and C, one or more compounds V and VI:

V

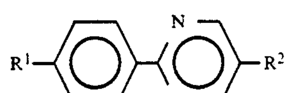

VI

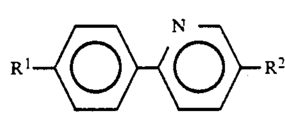

in which $R^1$ and $R^2$ are as defined in claim 1.

14. A display of claim 1, wherein the liquid-crystal mixture contains, in addition to the components A, B and C, one or more compounds VII to XI:

VII

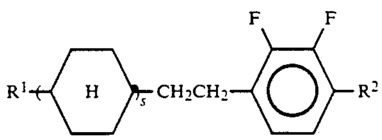

VIII

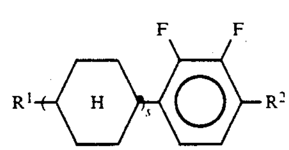

IX

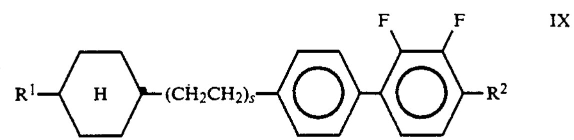

X

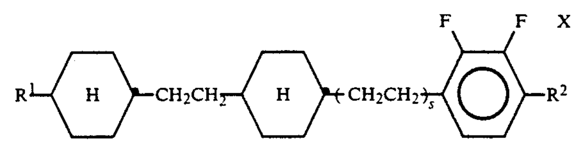

XI

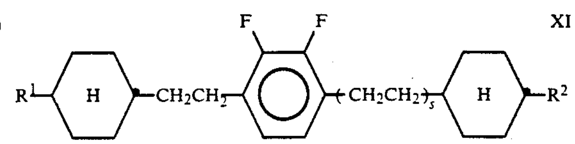

in which $R^1$ and $R^2$ are as defined in claim 1 and s is 0 or 1.

15. A liquid-crystal mixture comprising the following components:

a) 10 to 96% by weight of a liquid-crystalline component B composed of one or more compounds having a dielectric anisotropy of more than +1.5, selected from compounds of the formula IIa to IIf:

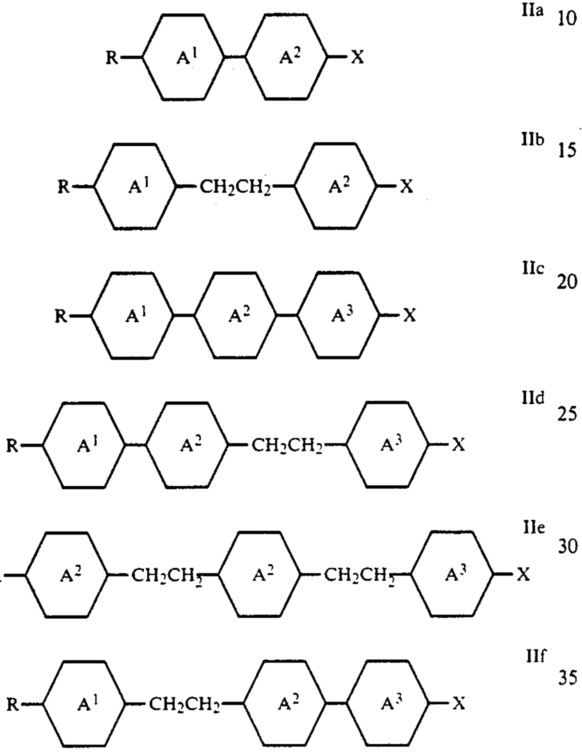

in which

R is n-alkyl or n-alkenyl, each containing up to 9 carbon atoms,

X is cyano, —NCS, F, Cl, $CF_3$, —$CHF_2$, —$OCF_3$, —$OCHF_2$, —$OCF_2CF_2H$ or —$OC_2F_5$, and the rings $A^1$, $A^2$ and $A^3$ are, in each case independently of each other, 1,4-phenylene, 2- or 3-fluoro-1,4-phenylene, 2,3-difluoro-1,4-phenylene, trans-1,4-cyclohexylene or 1,4-cyclohexenylene, b) 0 to 70% by weight of a liquid-crystalline component A composed of one or more compounds having a dielectric anisotropy of −1.5 to +1.5 of the formula I:

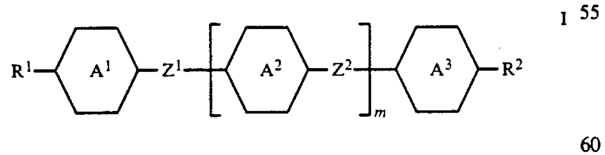

wherein $R^1$ and $R^2$ are, in each case independently of each other, n-alkyl, ω-fluoroalkyl or n-alkenyl, each containing up to 9 carbon atoms, the rings $A^1$, $A^2$ and $A^3$ are, in each case independently of each other, 1,4-phenylene, 2- or 3-fluoro-1,4-phenylene, trans-1,4-cyclohexylene or 1,4-cyclohexenylene, $Z^1$ and $Z^2$ are, in each case independently of each other, —$CH_2CH_2$— or a single bond, and m is 0, 1 or 2, c) 0 to 20% by weight of a liquid-crystalline component C composed of one or more compounds having a dielectric anisotropy of less than −1.5, and d) 4 to 15% by weight of a component D composed of one or more compounds of the formula:

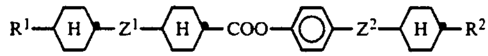

in which $R^1$, $R^2$, $Z^1$ and $Z^2$ are as defined for formula I, and the nematic liquid-crystal mixture has a nematic phase range of at least 60° C. and a viscosity at 20° C. of not more than 30 mPa.s, and wherein component B comprises at least 80% nitrile-free fluorinated compounds.

16. A composition of claim 15, wherein component B contains one or more compounds selected from compounds of the formulae IIa to IIf:

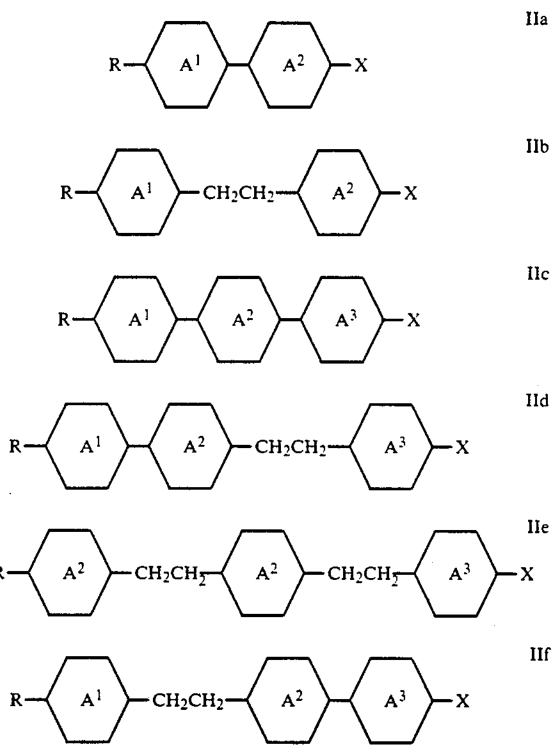

in which

R is n-alkyl or n-alkenyl, each containing up to 9 carbon atoms,

X is cyano, —NCS, F, Cl, $CF_3$, —$CHF_2$, —$OCF_3$, —$OCHF_2$, —$OCF_2CF_2H$ or —$OC_2F_5$, and the rings $A^1$, $A^2$ and $A^3$ are, in each case independently of each other, 1,4-phenylene, 2- or 3-fluoro-1,4-phenylene, 2,3-difluoro-1,4-cyclohexenylene.

17. A composition of claim 15, wherein component A contains one or more compounds II1 to II7:

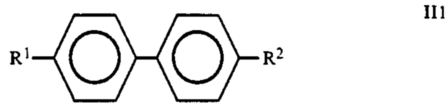

-continued

II2

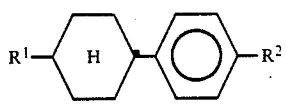

II3

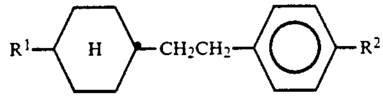

II4

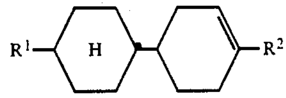

II5

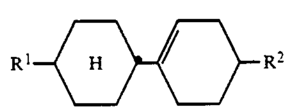

II6

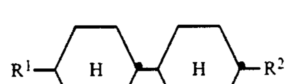

II7

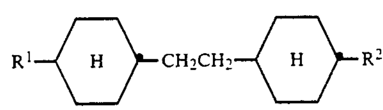

in which $R^1$ and $R^2$ are as defined in claim 15.

18. A composition of claim 15, wherein component A additionally contains one or more compounds II8 to II20:

II8

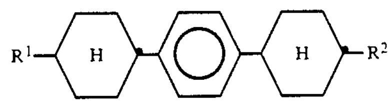

II9

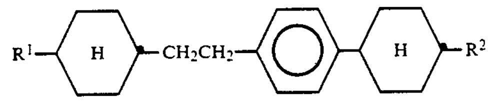

II10

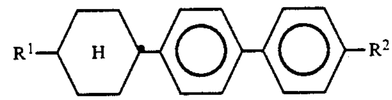

II11

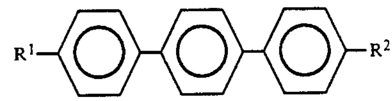

-continued

II12

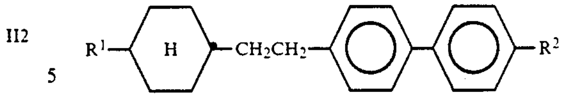

II13

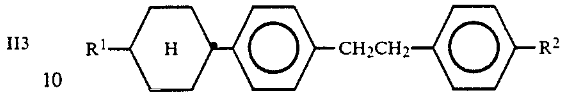

II14

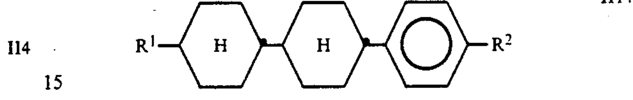

II15

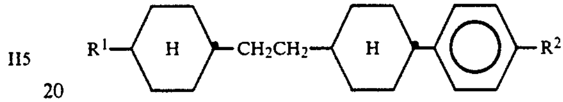

II16

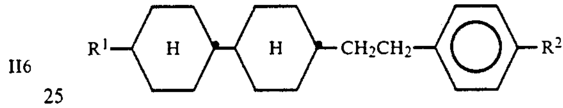

II17

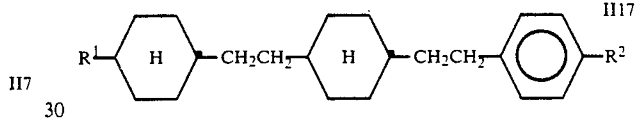

II18

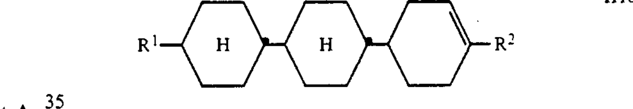

II19

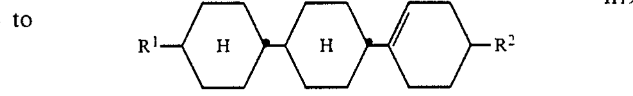

II20

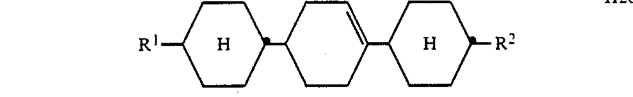

in which $R^1$ and $R^2$ are as defined in claim 15, and the 1,4-phenylene groups in II8 to II17 may, in each case independently of each other, also be mono- or polysubstituted by fluorine.

19. A display of claim 1, wherein component B is essentially free of nitrile-containing compounds.

20. A mixture of claim 15, wherein component B is essentially free of nitrile-containing compounds.

21. A display of claim 1, wherein component B is essentially free of aromatically bound ester functionalities.

22. A mixture of claim 15, wherein component B is essentially free of aromatically bound ester functionalities.

* * * * *